(12) United States Patent
Walter (10) Patent No.: US 9,945,664 B2
(45) Date of Patent: Apr. 17, 2018

(54) METHOD AND DEVICE FOR AUTOMATICALLY ESTIMATING PARAMETERS RELATING TO A FLIGHT OF AN AIRCRAFT

(71) Applicant: Airbus Operations S.A.S., Toulouse (FR)

(72) Inventor: Stéphane Walter, Brax (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 636 days.

(21) Appl. No.: 14/658,594

(22) Filed: Mar. 16, 2015

(65) Prior Publication Data

US 2016/0178364 A1 Jun. 23, 2016

(30) Foreign Application Priority Data

Mar. 18, 2014 (FR) ..................... 14 52200

(51) Int. Cl.
| | |
|---|---|
| *G01C 17/38* | (2006.01) |
| *G01B 21/22* | (2006.01) |
| *G01P 13/02* | (2006.01) |
| *G01P 21/00* | (2006.01) |
| *B64D 43/00* | (2006.01) |

(52) U.S. Cl.
CPC .............. *G01B 21/22* (2013.01); *B64D 43/00* (2013.01); *G01P 13/025* (2013.01); *G01P 21/00* (2013.01)

(58) Field of Classification Search
CPC ....... G01B 21/22; G01P 13/025; G01P 21/00; B64D 43/00

USPC .......................................................... 702/94
See application file for complete search history.

(56) References Cited

U.S. PATENT DOCUMENTS

| | | |
|---|---|---|
| 6,273,370 B1 | 8/2001 | Colgren |
| 2010/0100260 A1 | 4/2010 | McIntyre et al. |
| 2011/0071710 A1* | 3/2011 | Puig ...................... G01C 21/16 701/14 |

FOREIGN PATENT DOCUMENTS

| | | |
|---|---|---|
| EP | 2642302 A1 | 9/2013 |
| FR | 2979993 A1 | 3/2013 |
| WO | 2013144157 A1 | 10/2013 |

OTHER PUBLICATIONS

French Patent and Trademark Office, French Search Report for Application No. 1452200 dated Oct. 1, 2014.

* cited by examiner

*Primary Examiner* — Duy T Nguyen
(74) *Attorney, Agent, or Firm* — Lorenz & Kopf, LLP (57) ABSTRACT

The estimation device comprises an estimation assembly for determining a corrected estimated incidence, with the aid of an estimated incidence which is computed on the basis of aerodynamic parameters and of inertial parameters related to the aircraft and of a measured incidence which is determined on the basis of measurements carried out on the aircraft by at least one incidence probe. This estimation device thus makes it possible to obtain estimations of the speed of the aircraft, of its incidence and of the total temperature, on the basis of aerodynamic and inertial parameters.

14 Claims, 2 Drawing Sheets

METHOD AND DEVICE FOR AUTOMATICALLY ESTIMATING PARAMETERS RELATING TO A FLIGHT OF AN AIRCRAFT

CROSS REFERENCE TO RELATED APPLICATION

This application claims priority to French Patent Application No. 1452200 filed Mar. 18, 2014, which is incorporated herein by reference in its entirety.

TECHNICAL FIELD

This application pertains to a method and a device for automatically estimating at least one parameter related to a flight of an aircraft, and in particular the incidence of the aircraft.

BACKGROUND

Within the framework of the present embodiment, "parameters related to a flight of an aircraft" is intended to mean flight parameters of the aircraft, such as an air speed, an incidence or a Mach number of the aircraft, and parameters outside the aircraft and encountered by the aircraft in the course of the flight, such as the total temperature for example.

Such parameters related to a flight of an aircraft are generally determined with the aid of measurements carried out on the aircraft on the basis of probes, such as total pressure, total temperature or incidence probes. However, meteorological phenomena, such as ice in particular, can have effects on sensors and probes which may even lead to an impairment of the measurement carried out, rendering it sometimes erroneous (fixed or biased). The object of the present embodiment is in particular to remedy this drawback.

It is known that an aircraft, especially a transport airplane, is generally provided with an anemobarometric platform of ADC ("Air Data Computer") type which provides, in real time, a conventional speed of CAS (for "Calibrated Air Speed") type. Accordingly, this anemobarometric platform is associated with total pressure probes (Pitot tubes), and it may, for example, form part of an air data and inertial data system of ADIRS (for "Air Data Inertial Reference System") type, which represents a platform of inertial references integrating the functions of the anemobarometric platform. However, erroneous or absent air data (air speeds in particular) may, for example, appear during system faults, erroneous information from sensors, or in the presence of icing or ice crystals.

Patent FR-2 979 993 describes a method and device making it possible to provide an alternative air speed, able to be determined even in case of failure of an anemobarometric platform and/or pressure probes associated therewith, in particular Pitot probes. Accordingly, this patent FR-2 979 993 discloses in particular a method for automatically estimating a particularly accurate air speed of an aircraft that can be determined even in the presence of erroneous air data. This method makes provision, for this purpose, to compute an air speed termed the aerodynamic speed, on the basis of the current values of parameters (mass, load factor, incidence, etc.) related to the aircraft and comprising aerodynamic parameters, to receive a current conventional speed, generated by an anemobarometric platform, to subtract an estimated speed from this conventional speed so as to obtain a residual speed, to compare this residual speed with a threshold value, and as a function of this comparison as long as the residual speed is less than or equal to the threshold value, to integrate it so as to obtain a corrective value which is added to the aerodynamic speed so as finally to obtain the estimated air speed; and as soon as the residual speed is greater than the threshold value (for a duration of confirmation), illustrating the detection of a problem of validity of the conventional speed, and as long as this remains the case, to add a fixed corrective value to the aerodynamic speed to obtain the estimated air speed.

This method for automatically estimating the air speed of the aircraft makes it possible to obtain a good estimation of the air speed, in case of temporary failure of the total pressure probes.

This method for automatically estimating the air speed uses in particular a value of the angle of incidence of the aircraft to compute the air speed. The angle of incidence (or "angle of attack") is the angle between a reference line on the aircraft and the direction of movement of the aircraft with respect to the air mass which surrounds it. This angle is generally provided in real time by incidence probes, formed by wind vanes mounted on the outside surface of the aircraft.

However, in certain particular cases, ice may form at the level of the incidence probes and disturb their operation, thereby preventing a reliable indication of the angle of incidence from being available on the aircraft. Furthermore, if a disturbance of the operation of the total pressure tubes occurs simultaneously with such a disturbance of the operation of the incidence probes, the aforementioned method of automatically estimating the air speed cannot proceed correctly.

SUMMARY

An object of the present embodiment is to automatically estimate at least one parameter related to a flight of an aircraft, including at least one incidence of the aircraft, making it possible to remedy the aforementioned drawback. It relates to a method for automatically estimating at least one parameter related to a flight of an aircraft, comprising at least one first series of successive steps for automatically determining a corrected estimated incidence of an aircraft, in particular of a transport airplane, which is particularly accurate and which is able to be determined even in case of failure of incidence probes.

According to an embodiment, the first series of successive steps comprises, in an automatic and iterative manner: a) computing an estimated incidence on the basis of aerodynamic parameters and of inertial parameters related to the aircraft; b) measuring an incidence of the aircraft; c) verifying whether the measured incidence is considered to be consistent or inconsistent; and d) as a function of this verification as long as the measured incidence is considered to be consistent, in determining a correction value and in adding this correction value to said estimated incidence to obtain the corrected estimated incidence; and when the measured incidence is considered to be inconsistent, and as long as this remains the case, in adding a fixed corrective value to the estimated incidence to obtain the corrected estimated incidence.

The aerodynamic parameters are parameters resulting from measurements of the air around the aircraft. These parameters comprise the measurement of the static pressure and of the dynamic pressure, that are measured by static pressure probes and by dynamic pressure probes (Pitot tubes), the measurement of the incidence, provided by incidence probes, and the measurement of the temperature of the air. The reliability of some of these aerodynamic parameters may be subject to caution. Indeed, with the exception of the static pressure probe, all the aerodynamic parameter probes can be affected by freezing; and the inertial parameters are parameters provided by an inertial platform of the aircraft, and correspond to acceleration values measured by this inertial platform, or to speed or position values computed by integrating the acceleration values.

Computing the estimated incidence on the basis of aerodynamic parameters and of inertial parameters, instead of determining it on the basis of aerodynamic parameters as in the prior art, makes it possible to carry out this computation in the absence of some of the aerodynamic parameters. Thus, in a particular embodiment, the computation of the estimated incidence can be carried out using solely inertial parameters and the measurement of the static pressure. In this particular embodiment, the estimated incidence is insensitive to measurement errors related to the freezing of the aerodynamic probes.

Thus, by virtue of the embodiment, an incidence value (corrected estimated incidence), which is able to be determined even in case of failure (in particular of the icing) of incidence probes is available aboard the aircraft. Moreover, this incidence value exhibits sufficiently high accuracy for it to be usable by diverse systems of the aircraft.

Advantageously, step a) comprises in computing the estimated incidence $\alpha$ with the aid of the following expression: $\alpha=(\theta-\gamma)/\cos\varphi$ in which: $\theta$ is an angle of longitudinal inclination of the aircraft, also called the trim of the aircraft; $\varphi$ is an angle of roll of the aircraft; cos is the cosine; and $\gamma$ is an air slope of the aircraft.

Furthermore, in an advantageous manner, the method comprises a step consisting in computing the air slope $\gamma$ with the aid of the following expression: $\gamma=Vzbi/Vtas$ in which Vzbi is a vertical speed determined on the basis of inertial data of the aircraft; and Vtas is a true speed, which corresponds to an estimated true speed at least in the absence of any true speed value provided by an air data computer.

Furthermore, advantageously, the method comprises a step comprising computing an estimated true speed Vtas1 with the aid of the following expression: $Vtas1 = k1 * \sqrt{(\gamma * R * TAT)/(1+k2*M1^2)} * M1$ in which: $\gamma$ is an air slope of the aircraft; k1, k2 and R are predetermined values; TAT is a measured total temperature; and M1 is an estimated Mach number.

Furthermore, in an advantageous manner, the method also comprises a step comprising computing an estimated total temperature TAT1 with the aid of the following expression: $TAT1=(k3+\Delta ISA1-k4*Zp)*(1+k5*M1^2)$ in which: k3 to k5 are predetermined values; Zp is an altitude of the aircraft; M1 is an estimated Mach number; and $\Delta ISA1=((TAT1(1+k6*s))*(1/(1+k7*M1^2)))-8+k9*Zp$ in which: TAT is a measured total temperature; the expression (TAT1(1+k6*s)) corresponds to the value TAT filtered by a first-order filter, with time constant k6; and k6 to k9 are predetermined values.

Furthermore, in an advantageous manner, the method also comprises a step comprising computing an estimated Mach number M1, with the aid of the following expressions: when an altitude Zp of the aircraft lies between the ground and a first predetermined value, preferably 30 000 feet: $M1=(Vc1/k10)*(1+k11*Zp)^4$ when the altitude Zp of the aircraft lies between said first value and a second predetermined value (preferably 36 000 feet) which is greater than the first value: $M1=(Vc1/k10)*(1+k11*Zp+k12*(Zp-k13))^4$ in which Vc1 is an estimated air speed; Zp is the altitude of the aircraft lying between the ground and said second value; and k10 to k13 are predetermined parameters.

Furthermore, the method can exhibit at least some of the following characteristics, taken individually or in combination: in step c), the measured incidence is considered to be inconsistent if one of the following conditions is fulfilled: the difference between an estimated incidence and the measured incidence is greater than a predetermined threshold value for a predetermined duration; an air data computer considers the measured incidence to be inconsistent; the method comprises a step of monitoring at least one measured total temperature to detect possible icing of a total temperature probe.

Furthermore, in an advantageous manner, the method comprises, moreover, a second series of successive steps for automatically determining an estimated air speed of an aircraft, the second series of successive steps consisting, in an automatic and iterative manner: A/ in computing an air speed termed the aerodynamic speed, on the basis of current values of aerodynamic parameters and of inertial parameters of the aircraft, including an incidence value; B/ in determining a current conventional speed, with the aid of an anemobarometric platform; C/ in subtracting a speed estimated at the previous iteration from this conventional speed so as to obtain a residual speed; D/ in comparing this residual speed with a threshold value; and E/ as a function of this comparison: as long as this residual speed is less than or equal to said threshold value, in computing a corrective value which is applied to said aerodynamic speed to obtain the estimated air speed; and as soon as this residual speed is greater than said threshold value, and as long as this remains the case, in applying a fixed corrective value to said aerodynamic speed to obtain the estimated air speed, step A/ consisting in computing the aerodynamic speed by using the corrected estimated incidence, determined in step d) of the first series of successive steps, as incidence value.

The air speed, termed the aerodynamic speed, which is computed on the basis of aerodynamic parameters and of inertial parameters, can thus be computed in the absence of some of the aerodynamic parameters. Thus, in a particular embodiment, the computation of the aerodynamic speed can be carried out using solely inertial parameters and the measurement of the static pressure. In this particular embodiment, the aerodynamic speed is insensitive to measurement errors related to the freezing of the aerodynamic probes.

In a preferred embodiment, step E/ comprises an operation comprising, in order to apply the corrective value, in multiplying the aerodynamic speed by said corrective value.

Furthermore, advantageously, step E/ comprises an operation comprising computing the corrective value Vcorr with the aid of the following integration expression: $Vcorr=(Vc/Vcaero)/(1+\tau s)$ in which Vc is the conventional speed; Vcaero is the aerodynamic speed; and $\tau$ is a time constant.

The present embodiment also relates to a device for automatically estimating at least one parameter related to a flight of an aircraft, including at least one incidence of the aircraft, the device comprising at least one first estimation assembly for automatically determining a corrected estimated incidence.

For this purpose, according to the embodiment, the first estimation assembly comprises a first computation unit configured to compute an estimated incidence on the basis of aerodynamic parameters and of inertial parameters related to the aircraft; a reception unit configured to receive a measured incidence of the aircraft; a verification unit configured to verify whether the measured incidence is considered to be consistent or inconsistent; and a second computation unit configured to, as a function of this verification: as long as the measured incidence is considered to be consistent, determine a correction value and add this correction value to the estimated incidence to obtain the corrected estimated incidence; and as soon as the measured incidence is considered to be inconsistent, and as long as this remains the case, add a fixed corrective value to the estimated incidence to obtain the corrected estimated incidence.

Furthermore, in a particular embodiment, the device comprises, moreover, a second estimation assembly for automatically determining an estimated air speed of an aircraft, the second estimation assembling comprising a third computation unit configured to comprise an air speed termed the aerodynamic speed, on the basis of current values of aerodynamic parameters and of inertial parameters of the aircraft, including an incidence value; a reception unit configured to receive a current conventional speed, determined by an anemobarometric platform; a forth computation unit configured to subtract a speed estimated at the previous iteration from this conventional speed so as to obtain a residual speed; a fifth computation unit configured to compare this residual speed with a threshold value; and a sixth computation unit configured to, as a function of this comparison, as long as this residual speed is less than or equal to the threshold value, compute a corrective value that is applied to the aerodynamic speed to obtain the estimated air speed; and as soon as this residual speed is greater than the threshold value, illustrating the detection of a problem of validity of the conventional speed, and as long as this remains the case, apply a fixed corrective value to the aerodynamic speed to obtain the estimated air speed, the third computation unit being configured to determine the aerodynamic speed using the corrected estimated incidence, determined by the first estimation assembly, as incidence value.

Furthermore, advantageously, the device comprises, moreover, at least one of the following assemblies: an estimation assembly for determining an estimated true speed; an estimation assembly for determining an estimated total temperature; and an estimation assembly for determining an estimated Mach number.

The present embodiment relates, furthermore, to an aircraft, especially a transport airplane, which comprises a device such as that aforementioned.

BRIEF DESCRIPTION OF THE DRAWINGS

The figures of the appended drawing will elucidate the manner in which the embodiment may be embodied. In these figures, identical references designate similar elements.

DETAILED DESCRIPTION

Figure 1:
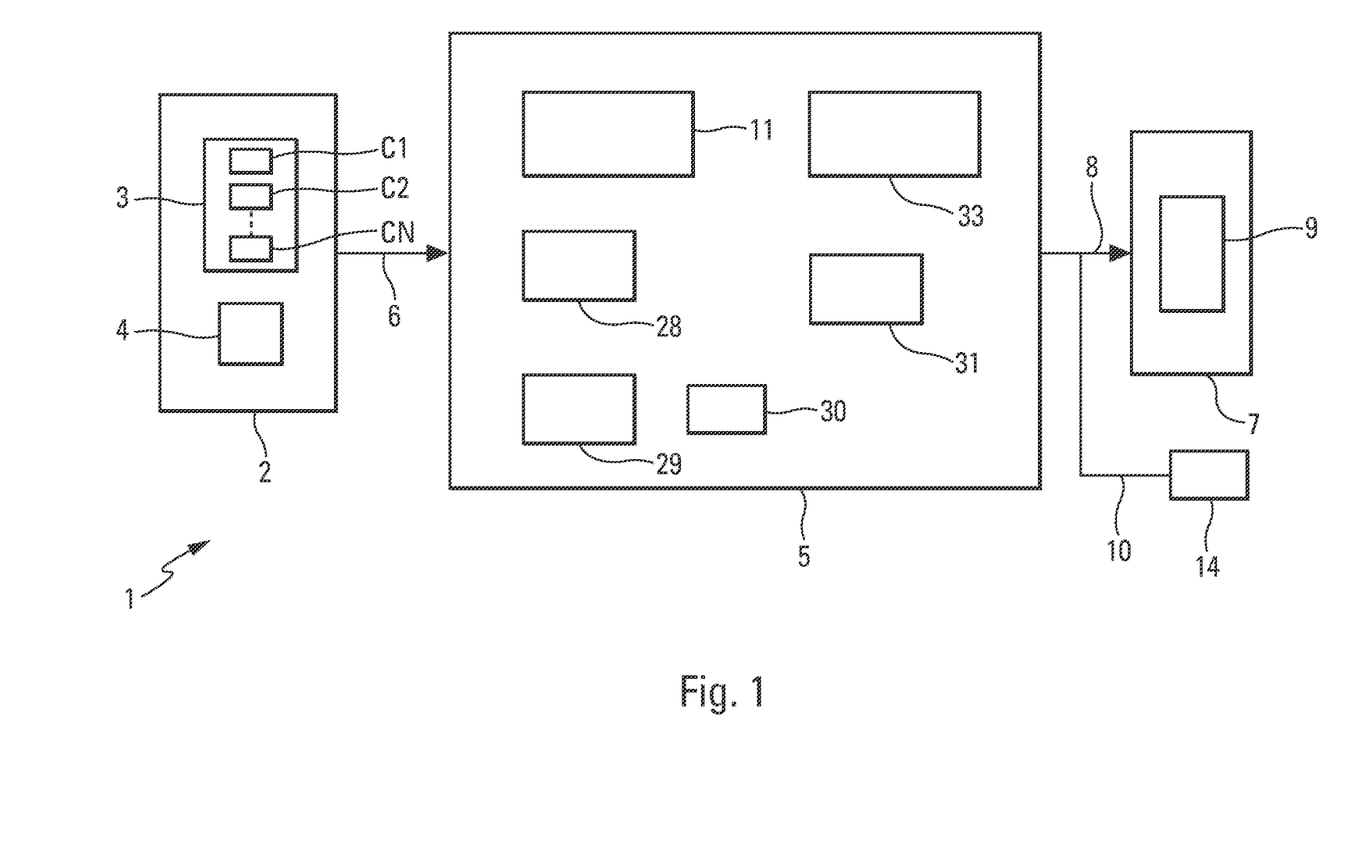
FIG. 1 is a schematic diagram of a particular embodiment of a device in accordance with the embodiment.

The device 1 illustrating the embodiment and represented schematically in FIG. 1 is intended in particular to automatically estimate parameters related to a flight of an aircraft (not represented), especially of a transport airplane, so as to provide parameters which are accurate and which are not disturbed or biased, in particular by erroneous air data.

These may be flight parameters of the aircraft, such as an air speed, an incidence or a Mach number of the aircraft, as well as parameters outside the aircraft and encountered by the aircraft in the course of the flight, such as the total temperature for example.

The device 1 which is onboard the aircraft comprises, in a standard manner, a standard assembly 2 of information sources, for example an air data and inertial data system of ADIRS (for "Air Data Inertial Reference System") type, which comprises: an assembly 3 of sensors C1, C2, ..., CN, N being an integer, especially probes and in particular total pressure, total temperature and incidence modes; and an assembly 4 of standard means, comprising for example an anemobarometric platform of ADC ("Air Data Computer") type, which determines and provides the values of parameters, with the aid in particular of measurements carried out by the assembly 3 of sensors.

The device 1 also comprises a processing unit 5 which is connected by way of a link 6 to the assembly 2; and a display unit 7 which is connected by way of a link 8 to the processing unit 5 and which is formed so as to display on at least one viewing screen 9 of the flight deck of the aircraft values of parameters determined by the device 1. One or more filters can be envisaged for filtering a value to be displayed before presenting it on the viewing screen 9, so as to obtain satisfactory visual comfort.

These values can also be transmitted to an assembly of user devices 14 of the aircraft (for example computers and/or alarm systems) via a link 10.

According to the embodiments, the processing unit 5 of the device 1 comprises at least one estimation assembly 11 (or estimation unit) for automatically determining a corrected estimated incidence.

Figure 2:
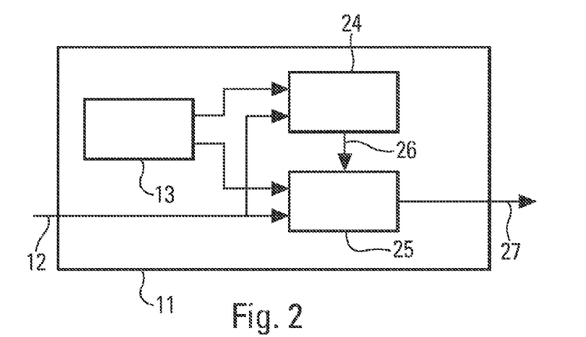
FIGS. 2 to 4 are a schematic diagrams of particular embodiments of processing assemblies of the device of FIG. 1.

For this purpose, according to the embodiments, the estimation assembly 11 comprises, as represented in FIG. 2: reception means (link 12) configured to receive a measured incidence of the aircraft, provided by the assembly 2 (the link 12 being for example connected with the link 6); a computation unit 13 configured to compute an estimated incidence on the basis of aerodynamic parameters and of inertial parameters related to the aircraft (and also received from the assembly 2); a verification unit 24 configured to verify whether the measured incidence (received via the link 12) is considered to be consistent or inconsistent; and a computation unit 25 configured to, as a function of the verification carried out by the verification unit 24 (and received via a link 26): as long as the measured incidence is considered to be consistent, determine a correction value and add this correction value to the estimated incidence to obtain the corrected estimated incidence; and as soon as the measured incidence is considered to be inconsistent, and as long as this remains the case, add a fixed corrective value to the estimated incidence to obtain the corrected estimated incidence.

The estimation assembly 11 can transmit the corrected estimated incidence via a link 27 to various estimation and/or processing elements of the device 1 and/or to user means external to the device 1 (for example by way of the links 8 and 10).

Thus if the measured incidence is considered to be credible (consistent), a correction value is computed so as to make a corrected estimated incidence converge with the measured incidence; and if the measured incidence is considered to be non-credible (inconsistent), the correction value is fixed at its last value considered to be correct, and the corrected estimated incidence is rendered independent of the measured incidence.

Consequently, by virtue of the estimation assembly 11 of the device 1, and incidence value (corrected estimated incidence), which is able to be determined even in case of failure (of icing in particular) of incidence probes, is available aboard the aircraft. Moreover, this incidence value exhibits sufficiently high accuracy for it to be usable by diverse systems of the aircraft. The verification unit of 24 considers the measured incidence to be inconsistent if one of the following conditions is fulfilled: the difference between as estimated incidence and the measured incidence is greater than a predetermined threshold value for a predetermined duration; and an air data computer of ADC type, forming, for example, part of the assembly 2, considers the measured incidence to be inconsistent an demits a corresponding message, for example, when the speed descends below 60 knots.

An alarm (audible and/or visual) is triggered when the difference between the measured incidence and the estimated incidence exceeds a threshold (for example 1°), for at least one predetermined duration (for example 10 s).

Figure 3:
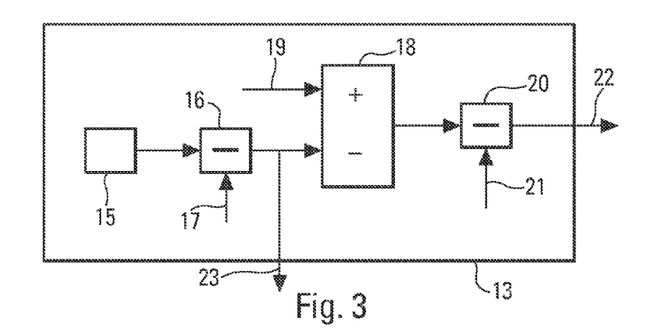

Furthermore, the computation unit 13 comprises, as represented in FIG. 3: a means 15 for determining, in a standard manner, a vertical speed Vzbi with the aid of inertial data of the aircraft; a computation means 16 for computing an air slope γ representing the ratio between this vertical speed Vzbi and a true speed Vtas. The true speed Vtas, received by way of a link 17, corresponds to an estimated true speed Vtas1 (specified hereinbelow) at least in the absence of any true speed value provided by an air data computer (of the assembly 2); a computation means 18 for subtracting the air slope γ determined by the computation means 16 from a longitudinal angle of inclination θ of the aircraft, received by way of a link 19 (for example of the assembly 2); and a computation means 20 for computing the ratio between the difference received from the computation means 18 and the cosine of the angle of roll φ of the aircraft, received by a link 21 (for example of the assembly 2).

The computation unit 13 therefore comprises computation elements for computing the estimated incidence α with the aid of the following expression: α=(θ−γ)/cos φ in which θ is the angle of longitudinal inclination of the aircraft, also called the trim of the aircraft; φ is the angle of roll of the aircraft; cos is the cosine; and γ is the air slope of the aircraft.

The computation unit 13 can transmit this estimated incidence α (via a link 22) to various estimation and/or processing elements of the device 1 (units 24 and 25 in particular) and/or to user means external to the device 1 (for example by way of the links 8 and 10).

Likewise, the air slope γ computed by computation element 16 can be transmitted via a link 23 to various estimation and/or processing elements of the device 1 and/or to user means external to the device 1 (for example by way of the links 8 and 10). The computation element 16 is therefore configured to compute the air slope γ with the aid of the following expression: γ=Vzbi/Vtas in which Vzbi is the vertical speed determined on the basis of inertial data of the aircraft; and Vtas is the true speed, which corresponds to an estimated true speed Vtas1 at least in the absence of any true speed value provided by an air data computer. The processing unit 5 of the device 1 comprises, moreover, a computation element 28 for computing an estimated true speed Vtas1 with the aid of the following expression: Vtas1=k1*$\sqrt{(\gamma*R*TAT)/(1+k2*M1^2)}*M1$ in which γ is the air slope of the aircraft; k1, k2 and R are predetermined values, namely: k1=1/0.5144; k2=0.2; R=287J; TAT is a measured total temperature; and M1 is an estimated Mach number, specified hereinbelow.

Furthermore, the processing unit 5 of the device 1 also comprises a computation element 29 for computing an estimated total temperature TAT1 (expressed in °K) with the aid of the following expression: TAT1=(k3+ΔISA1−k4*Zp)*(1+k5*M1²) in which k3 to k5 are predetermined values, namely; k3=288; k4=1.98/1000; k5=0.2; Zp is an altitude of the aircraft, expressed in feet; and M1 is the estimated Mach number.

Furthermore, the device 1 also comprises a computation element, in particular the computation element 29, for computing the aforementioned value ΔISA1 with the aid of the following expression: ΔISA1=((TAT 1(1+k6*s))*(1/(1+k7*M1²)))−k8+k9*Zp in which TAT is a measured total temperature, expressed in °K; the expression (TAT/(1+k6*s)) corresponds to the measured total temperature TAT, filtered by a first-order filter with time constant k6; and k6 to k9 are predetermined values, namely: k6=30; k7=0.2; k8=288; and k9=1.98/1000.

Furthermore, the device 1 comprises a unit 30 for monitoring a measured total temperature (and received for example from the assembly 2) to detect possible icing of a total temperature probe.

The monitoring unit 30 (which preferably forms part of the processing unit 5) comprises a computation element for determining the difference between the estimated total temperature, received from the computation element 29, and a measured total temperature, received from the assembly 2, and a comparison element for comparing this difference with a threshold value.

In a particular embodiment, the monitoring unit 30 indicates that the measured total temperature is considered to be freezing (icing of the total temperature probes) if the aforementioned difference exceeds a first threshold, for example 10° C.; and the measured total temperature is again considered to be not freezing, if the aforementioned difference goes back below a second threshold, for example 5° C.

Moreover, the processing unit 5 of the device 1 also comprises a computation element 31 for determining an estimated Mach number M1, with the aid of the following expressions when the altitude Zp of the aircraft lies between the ground (0 feet) and a first predetermined value, preferably 30 000 feet: M1=(Vc1/k10)*(1+k11*Zp)⁴ and when the altitude Zp of the aircraft lies between the first value and a second predetermined value (greater than this first value), preferably 36 000 feet: M1=(Vc1/k10)*(1+k11*Zp+k12*(Zp−k13))⁴ in which Vc1 is an estimated air speed, expressed in knots; Zp is the altitude of the aircraft, expressed in feet and defined between 0 feet and 36 000 feet (flight level: FL360); and k10 to k13 are predetermined parameters, namely: k10=661.5; k11=5*10⁻⁶; k12=1.2*10⁻⁶; and k13=30000.

Figure 4:
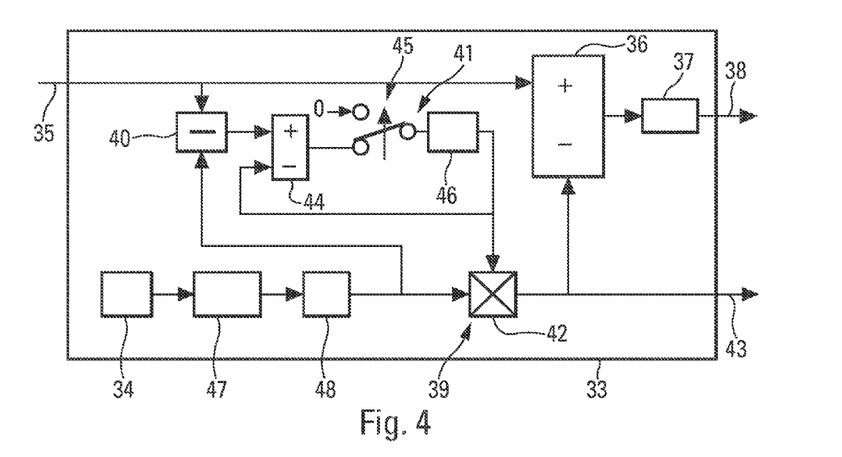

Furthermore, in a particular embodiment, the device 1 comprises, moreover, an estimation assembly 33 (or estimation unit) for automatically determining an estimated air speed of the aircraft. This estimation assembly 33 comprises, as represented in FIG. 4: a computation unit 34 configured to compute an air speed termed the aerodynamic speed, on the basis of current values (received from the assembly 2) of aerodynamic parameters and of inertial parameters of the aircraft; a means (namely a link 35) for receiving a current conventional speed, determined by an anemobarometric platform and received from the assembly 2; a computation unit 36 configured to subtract a speed estimated at a previous iteration from this conventional speed so as to obtain a residual speed; a computation unit 37 configured to compare this residual speed with a threshold value λ, for example 20 knots; and a computation unit configured 39 to, as a function of this comparison as long as this residual speed is less than or equal to the threshold value, compute a corrective value which is applied (by a multiplication as specified hereinbelow) to the aerodynamic speed to obtain the estimated air speed; and as soon as this residual speed is greater than the threshold value, illustrating the detection of a problem of validity of the conventional speed, and as long as this remains the case, apply a fixed corrective value to the aerodynamic speed to obtain the estimated air speed.

An alarm (audible and/or visual) which is for example connected to the computation unit 37 via a link 38, is triggered when the difference between the measured speed and the estimated speed exceeds a threshold (for example 20 knots) for a predetermined duration. The computation unit 34 computes the aerodynamic speed Vcaero, in a standard manner, with the aid of the following expression:

$$Vcaero = \sqrt{\frac{Ma * 9.81 * nz}{0.5 * \rho_0 * S * Cza * (\alpha - \alpha_0)}}$$

in which Ma is the mass of the aircraft in kg; nz is the vertical load factor; $\rho_0$ is the density of the air, which is equal to 1.225 kg/m$^3$; Cz α represents the lift gradient and equals about 6; α is an incidence value of the aircraft; and $\alpha_0$ is the incidence at zero lift, which depends on the configuration of the slats and flaps and the deflection of the airbrakes.

In a preferred embodiment, the computation unit 34 computes the aerodynamic speed using the corrected estimated incidence, determined by the estimation assembly 11, as incidence value α. The estimation assembly 33 comprises at the output of the computation element 34 limitation means 47: for limiting the signal (aerodynamic speed) received from the computation element 34 between two speed values, for example between 80 and 400 knots; and for limiting the slope of this signal.

The estimation assembly 33 also comprises a filter 48 at the output of the limitation means 47. Furthermore, the computation unit 39 comprises a computation element 40 for dividing the conventional speed by the value at the output of the filter 48; a filtering system 41; and a multiplier 42 which multiplies the value relating to the aerodynamic speed (received from the filter 48) by the output of the filtering system 41 to obtain the estimated air speed. This estimated air speed can be transmitted by a link 43 to various estimation and/or processing elements of the device 1 and/or to user means external to the device 1 (for example by way of the links 8 and 10). Furthermore, the filtering system 41 comprises a computation element 44 for computing the difference between the output of the computation element 40 and the output of the filtering system 41; and a switching means 45 which switches to 0 in case of icing (detected by the element 37); and an integrator 46.

During a detection of icing by the element 37, the switching means 45 is controlled so as to convey the input of the integrator 46 to a zero value, rather than to the output of the computation means 44, so that the integrator 46 now uses the fixed corrective value (which is recorded). This fixed corrective value corresponds to the last corrective value computed, before the detection of a problem of validity of the conventional speed Vc.

The computation unit 39 therefore makes provision to multiply the aerodynamic speed by the corrective value (with the aid of the multiplier 42). Thus, in contradistinction to the solution advocated in the aforementioned patent FR-2 979 993, in which the correction value afforded to the aerodynamic speed is an absolute value, the correction implemented by the estimation assembly 33 relates to a multiplier factor. This way of applying the correction prevents the corrected aerodynamic speed from deviating from the real air speed if the failure of the anemobarometric platform continues while the speed of the aircraft varies greatly (going from a cruising speed to an approach speed).

The integrator 46 computes the corrective value Vcorr with the aid of the following integration expression: Vcorr= (Vc/Vcaero)/(1+τs) in which Vc is the conventional speed; Vcaero is the aerodynamic speed; and τ is the time constant.

Thus, by virtue of the estimation assembly 33 of the device 1, alternative (with respect to the standard speeds) air speed information Vcest is available aboard the aircraft, which on the one hand, exhibits sufficiently high accuracy for it to be usable by diverse systems of the aircraft; and on the other hand, is able to be determined even in case of problem of validity of the conventional speed Vc, that is to say even in case of failure of an anemobarometric platform or of pressure probes associated therewith, Pitot probes in particular.

The estimation assembly 33 of the device 1 thus simultaneously makes it possible. On the one hand, in the absence of any problem of validity of the conventional speed Vc, through the correction carried out on the aerodynamic speed Vcaero so as to make it converge toward the conventional speed Vc, to remedy a problem of reduced accuracy of an aerodynamic speed Vcaero; and on the other hand, in case of problem of validity (or of loss) of the conventional speed Vc (in particular during a problem with the Pitot probes) to disregard the latter.

In the latter case, an accurate estimated air speed Vcest is always available, since the aerodynamic speed Vcaero continues to be corrected by multiplying it by a fixed corrective value which is as accurate as possible, given that it corresponds to the last corrective value computed before the detection of the problem of validity of the conventional speed Vc.

Furthermore, on takeoff of the aircraft, that is to say upon activation of the device 1, the latter initializes the integrator 46, to a value Vc/Vcaero in such a way that the estimated air speed Vcest is then equal to the conventional speed Vc.

Furthermore, within the framework of the present embodiments, provision may also be made for an alternative solution to the estimated air speed. It is, indeed, also possible to compute an estimated Mach number M2 rather than an estimated speed on the basis of the following lift equation (with PS the static pressure):

$$M2 = \sqrt{\frac{Ma * 9.81 * nz}{0.7 * PS * S * Cza * (\alpha - \alpha_0)}}$$

In this case, we carry out an integration of the ratio Mach/M2 to obtain the estimated Mach number as long as icing is not detected; a computation of the true speed and of the incidence, as described previously; and one and the same monitoring of the iced total temperature.

The computation of the estimated speed Vc2 is carried out with the aid of the Fabre-Bilange formula (expressed in knots):

$$Vc2=661.5*M2*\sqrt{PS/P0}(1+1/8*(1-PS/P0)*M2^2$$

This expression is correct whatever the altitude. The device 1, such as described hereinabove, exhibits fast adaptation to any type of aircraft. Moreover, the embodiment makes no provision to eliminate the aerodynamic probes (total pressure probes, incidence probes, total temperature probes, etc.), but to afford a solution allowing the aircraft to fly for a certain time under severe icing conditions, without such probes, even with wind gradients or turbulence.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for automatically estimating at least one parameter related to a flight of an aircraft comprising:
   a first series of successively-repeated steps performed in a first estimation assembly of a processing unit onboard the aircraft for automatically determining a corrected estimated incidence value, each of said first series of successively-repeated steps comprising, in an automatic and iterative manner:
   a) computing an estimated incidence $\alpha$ of the aircraft in a first computational unit of the first estimation assembly with the aid of the following expression:

$$\alpha=(\theta-\gamma)/\cos\varphi$$

in which:
   $\theta$ is an angle of longitudinal inclination of the aircraft;
   $\cos\varphi$ is the cosine of an angle of roll of the aircraft; and
   $\gamma$ is an air slope of the aircraft;
   b) receiving a measured incidence of the aircraft from a data system onboard the aircraft and in communication with the processing unit;
   c) verifying whether the measured incidence is considered to be consistent in a verification unit of the first estimation assembly each time the measured incidence is received from the data system;
   d) as a function of the verification carried out in step c):
   adding a computed correction value to said estimated incidence $\alpha$ in a second computational unit of the first estimation assembly in communication with the first computational unit and the verification unit to obtain the corrected estimated incidence value when the measured incidence is considered to be consistent; and
   adding a first corrective value to said estimated incidence $\alpha$ in the second computational unit to obtain the corrected estimated incidence value when the measured incidence is not considered to be consistent, wherein the first corrective value is based on a previously-computed correction value when the measured incidence was considered to be consistent; and
   a second series of successively repeated steps, performed in a second estimation assembly of the processing unit in communication with the first estimation unit, the second estimation assembly comprising a third computational unit in communication with the second computational unit and configured to automatically determine an estimated air speed of the aircraft using the corrected estimated incident value to calculate an aerodynamic speed when a conventional speed of the aircraft is determined to be invalid.

2. The method as claimed in claim 1, further comprising computing the air slope $\gamma$ in the first computational unit with the aid of the following expression:

$$\gamma=Vzbi/Vtas$$

in which:
   Vzbi is a vertical speed determined on the basis of inertial data of the aircraft; and
   Vtas is a true speed, which corresponds to an estimated true speed at least in the absence of any true speed value provided by an air data computer.

3. The method as claimed in claim 1, wherein automatically estimating the at least one parameter related to a flight of the aircraft further comprises computing an estimated true speed Vtas1 in a fourth computational unit of the processing unit with the aid of the following expression:

$$Vtas1=k1*\sqrt{(\gamma*R*TAT)/(1+k2*M1^2)}*M1$$

in which:
   $\gamma$ is the air slope of the aircraft;
   k1, k2 and R are predetermined values;
   TAT is a measured total temperature; and
   M1 is an estimated Mach number.

4. The method as claimed in claim 1, wherein automatically estimating the at least one parameter related to the flight of the aircraft further comprises computing an estimated total temperature TAT1 in a fourth computational unit of the processing unit with the aid of the following expression:

$$TAT1=(k3+\Delta ISA1-k4*Zp)*(1+k5*M1^2)$$

in which:
   k3 to k5 are predetermined values;
   Zp is an altitude of the aircraft;
   M1 is an estimated Mach number; and $$\Delta ISA1=((TAT/(1+k6*s))*(1/(1+K7*M1^2)))-k8+k9*Zp$$

in which:
   TAT is a measured total temperature;
   the expression (TAT/(1+k6*s)) corresponds to the value TAT filtered by a first-order filter, with time constant k6; and
   k6 to k9 are predetermined values.

5. The method as claimed in claim 1, wherein automatically estimating the at least one parameter related to the flight of the aircraft further comprises computing an estimated Mach number M1 in a fourth computational unit of the processing unit with the aid of the following expressions:
   when an altitude Zp of the aircraft lies between the ground and a first predetermined value:

$$M1=(Vc1/k10)*(1+k11*Zp)^4$$

when the altitude Zp of the aircraft lies between said first value and a second predetermined value greater than said first value:

$$M1=(Vc1/k10)*(1+k11*Zp=k12*(Zp-k13))^4$$

in which:
   Vc1 is an estimated air speed;

Zp is the altitude of the aircraft lying between the ground and said second value; and k10 to k13 are predetermined parameters.

6. The method as claimed in claim 1, wherein in step c), the measured incidence is not considered to be consistent when one of the following conditions is fulfilled:

the difference between the estimated incidence a and the measured incidence is greater than a predetermined threshold value for a predetermined duration; and the measured incidence is considered to be inconsistent with the flight of an aircraft.

7. The method as claimed in claim 1, which comprises a step of monitoring at least one measured total temperature to detect possible icing of a total temperature probe.

8. A method for automatically estimating at least one parameter related to a flight of an aircraft comprising:

a first series of successively-repeated steps performed in a first estimation assembly of a processing unit onboard the aircraft for automatically determining a corrected estimated incidence value, each of said first series of successively-repeated steps comprising in an automatic and iterative manner:

a) computing an estimated incidence $\alpha$ of the aircraft in a first computational unit of the first estimation assembly on the basis of aerodynamic parameters and of inertial parameters related to the aircraft;

b) receiving a measured incidence $\alpha$ of the aircraft from a data system onboard the aircraft and in communication with the processing unit;

c) verifying whether the measured incidence is considered to be consistent in a verification unit of the first estimation assembly each time the measured incidence is received from the data system;

d) as a function of the verification carried out in step c):

adding a computed correction value to said estimated incidence $\alpha$ in a second computational unit of the first estimation assembly in communication with the first computation unit and the verification unit to obtain the corrected estimated incidence value when the measured incidence is considered to be consistent; and adding a first corrective value to said estimated incidence $\alpha$ in the second computational unit to obtain the corrected estimated incidence value when the measured incidence is not considered to be consistent, wherein the first corrective value is based on a previously-computed correction value when the measured incidence was considered to be consistent; and a second series of successively-repeated steps performed in a second estimation assembly of the processing unit in communication with the first estimation assembly for automatically determining an estimated air speed of the aircraft using the corrected estimated incident value to calculate an aerodynamic speed when a current conventional speed of the aircraft is determined to be invalid, each of said second series of successively-repeated steps comprising, in an automatic and iterative manner:

A/ computing an air speed termed the aerodynamic speed in a third computational unit in the second estimation assembly, on the basis of current values of aerodynamic parameters and of inertial parameters of the aircraft, including the corrected estimated incidence value;

B/ determining the current conventional speed, with the aid of an anemobarometric platform;

C/ subtracting a speed estimated at the previous iteration from the conventional speed in a fourth computational unit in the second estimation assembly so as to obtain a residual speed;

D/ comparing the residual speed with a threshold value in a fifth computational unit in the second estimation assembly; and E/ as a function of the comparison:

computing a corrective speed value Vcorr which is applied to said aerodynamic speed in a sixth computational unit in communication with the third and fifth computational units in the second estimation assembly to obtain the estimated air speed when the residual speed is less than or equal to the threshold value; and applying continuously a second corrective value to the aerodynamic speed in the sixth computational unit to obtain the estimated air speed when the residual speed is greater than the threshold value;

wherein step A/ comprises computing the aerodynamic speed by using the corrected estimated incidence, determined in step d) of the first series of successive steps, as an incidence value.

9. The method as claimed in claim 8, wherein step E/ comprises, in order to apply the second corrective value, in multiplying the aerodynamic speed by the corrective value.

10. The method as claimed in claim 8, wherein step E/ comprises computing the corrective speed value Vcorr with the aid of the following integration expression:

$$Vcorr=(Vc/Vcaero)/(1\tau s)$$

in which:

Vc is the conventional speed;

Vcaero is the aerodynamic speed; and $\tau$ is a time constant.

11. A device for automatically estimating at least one parameter related to a flight of an aircraft, including at least one incidence of the aircraft, the device comprising:

a first estimation assembly of a processing unit onboard the aircraft for automatically determining a corrected estimated incidence, the first estimation assembly comprising:

a first computation unit configured to compute an estimated incidence $\alpha$ with the aid of the following expression:

$$\alpha=(\theta-\gamma)/\cos\varphi$$

in which:

$\theta$ is an angle of longitudinal inclination of the aircraft;

$\cos\varphi$ is the cosine of an angle of roll of the aircraft; and $\gamma$ is an air slope of the aircraft;

a reception unit configured to receive a measured incidence of the aircraft from a data system onboard the aircraft and in communication with the processing unit;

a verification unit configured to verify whether the measured incidence is considered to be consistent, a second computation unit in communication with the first computation unit and the verification unit configured to, as a function of the verification carried out by the verification unit:

add a computed correction value to the estimated incidence to obtain the corrected estimated incidence value when the measured incidence is considered to be consistent; and add a first corrective value to the estimated incidence to obtain the corrected estimated incidence value as long as the measured incidence is considered to be inconsistent, wherein the first corrective value is based on a previously-computed correction value when the measured incidence was considered to be consistent; and a second estimation assembly of the processing unit in communication with the first estimation unit, the second estimation assembly comprising a third computation unit in communication with the second computation unit and configured to automatically determine an estimated air speed of the aircraft using the corrected estimated incident value for calculating an aerodynamic speed when a conventional speed of the aircraft, is determined to be invalid.

12. The device as claimed in claim 11, wherein said second estimation assembly comprising:

the third computation unit in the second estimation assembly configured to compute the aerodynamic speed, on the basis of current values of the aerodynamic parameters and of the inertial parameters of the aircraft, including the corrected estimated incidence value;

a reception unit of the second estimation assembly configured to receive the current conventional speed determined by an anemobarometric platform;

a fourth computation unit of the second estimation assembly configured to subtract a speed estimated at a previous iteration from the conventional speed so as to obtain a residual speed;

a fifth computation unit of the second estimation assembly configured to compare the residual speed with a threshold value; an a sixth computation unit of the second estimation assembly configured to, as a function of this comparison:

compute a computed corrective value which is applied to said aerodynamic speed to obtain the estimated air speed when the residual speed is less than or equal to said threshold value; and illustrate the detection of a problem of validity of the conventional speed, and apply a second corrective value to the aerodynamic speed to obtain the estimated air speed as long as the residual speed is greater than the threshold value;

the third computation unit being configured to compute the aerodynamic speed using the corrected estimated incidence value, determined by the first estimation assembly.

13. The device as claimed in claim 11, further comprising, at least one of the following assemblies:

a true speed estimation assembly of the processing unit in communication with the first estimation assembly for determining an estimated true speed;

a total temperature estimation assembly of the processing unit in communication with the first estimation assembly for determining an estimated total temperature; and a Mach number estimation assembly of the processing unit in communication with the first estimation assembly for determining an estimated Mach number.

14. The aircraft, which comprises the device for automatically estimating the at least one parameter related to the flight of the aircraft as claimed in claim 11.

* * * * *